Feb. 25, 1964 — C. H. ROCH — 3,122,357
COMBINED CLOSURE AND MIXER OR STIRRER
Filed Aug. 3, 1961 — 2 Sheets-Sheet 1
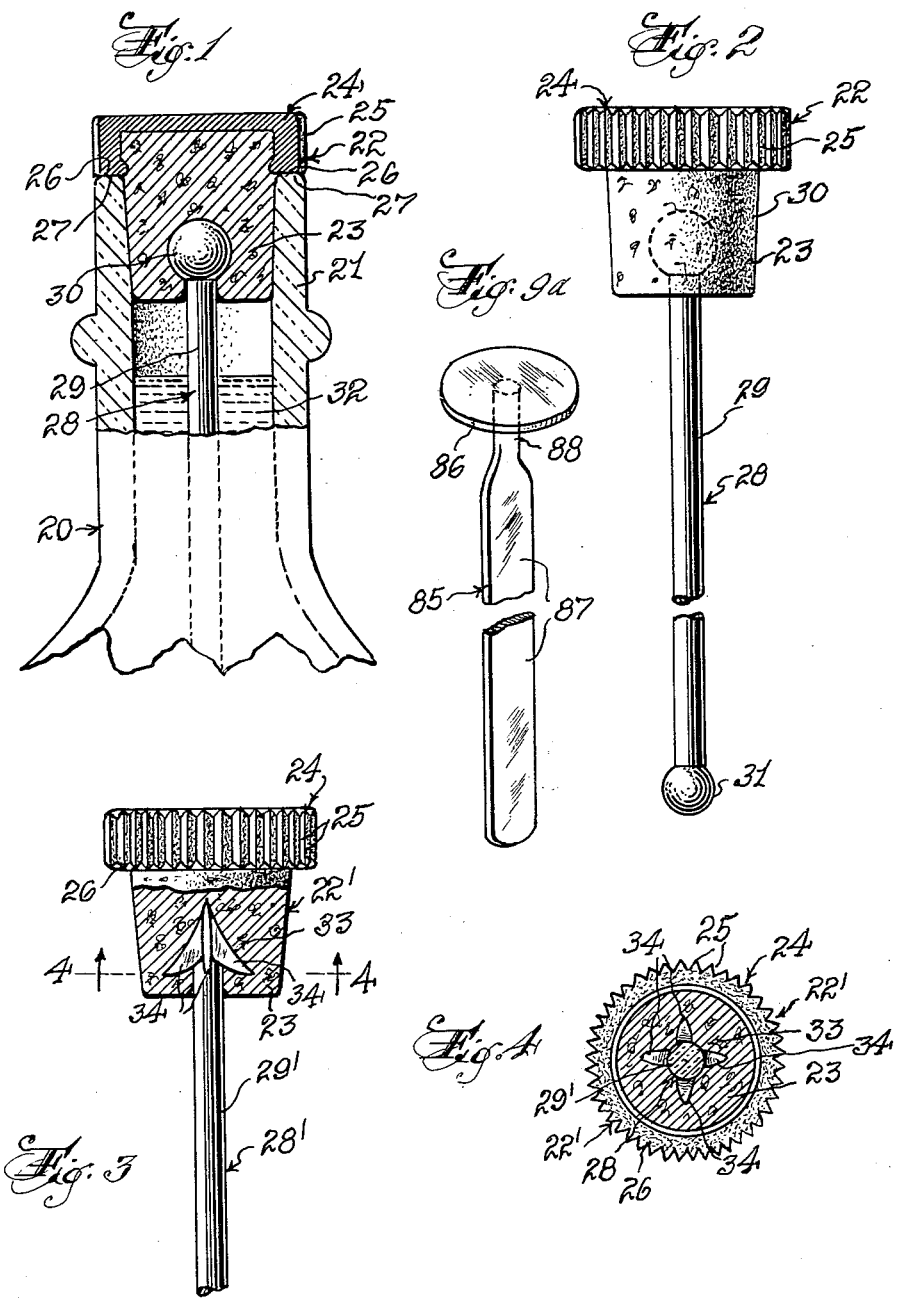
INVENTOR.
Carl H. Roch,
BY Victor J. Evans & Co.
ATTORNEYS.

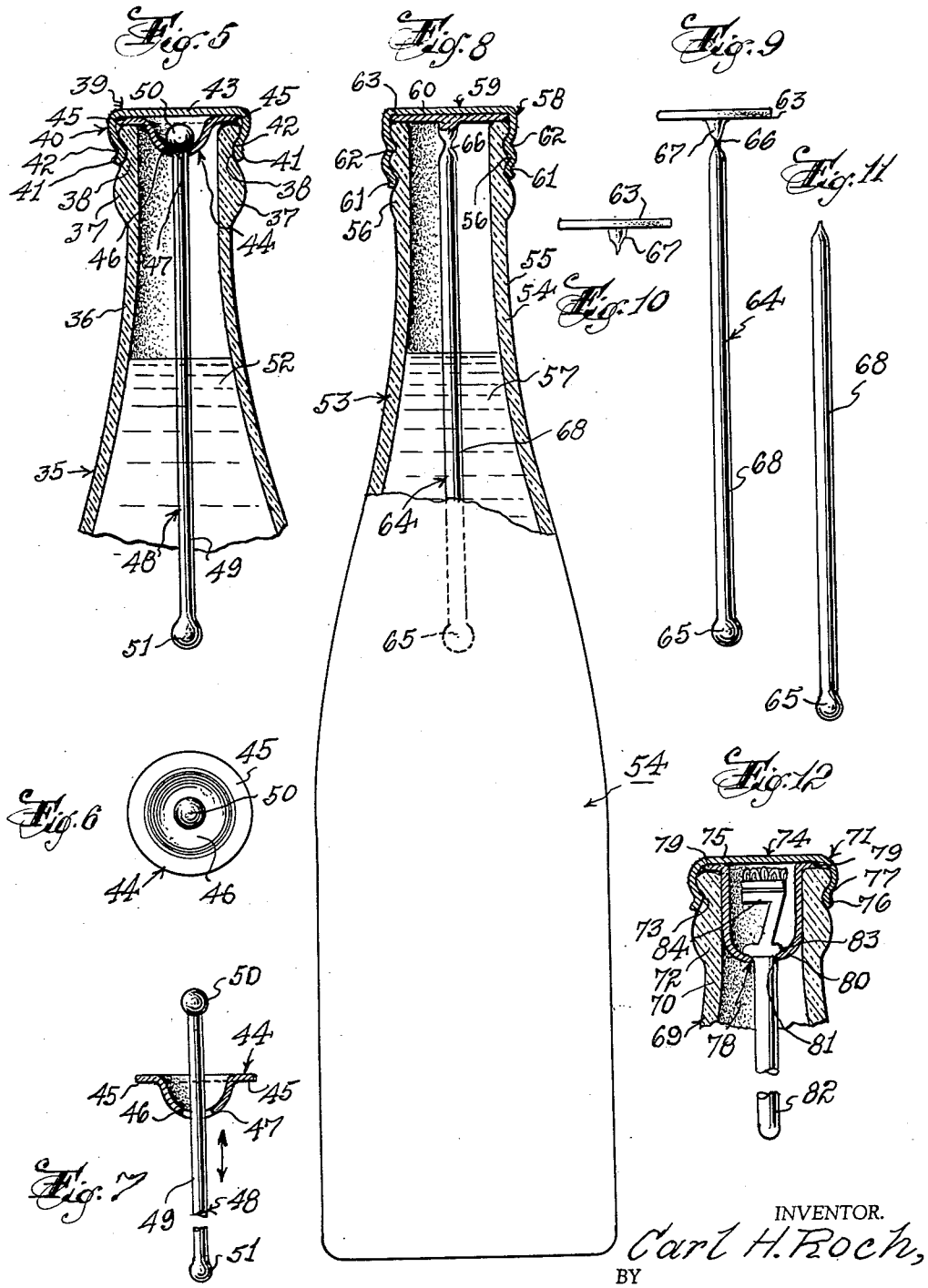

United States Patent Office 3,122,357
Patented Feb. 25, 1964

3,122,357
COMBINED CLOSURE AND MIXER OR STIRRER
Carl H. Roch, P.O. Box 787, Tampa, Fla.
Filed Aug. 3, 1961, Ser. No. 129,077
3 Claims. (Cl. 259—116)

The present invention relates to a combined closure and mixing stick for a container such as a bottle.

The primary object of the present invention is to provide a closure which has operatively connected thereto a mixing stick so that the present invention has a dual capacity, that is, it functions as a convenient closure as well as a mixing device or stick.

A further object is to provide a combined closure and mixer which is constructed so that it can be used for closing a bottle such as a bottle containing a liquid or fluid, and wherein when the closure is removed from the bottle, a mixing stick is conveniently and readily presented which can be used for stirring or mixing drinks or the like.

A still further object of the present invention is to provide a combined bottle closure and mixing stick which can be used as a novel advertizing device or sales promotion member, and wherein the combined closure and mixing device is adapted to be sold or distributed as a single unit which may be initially mounted on the usual neck portion of a bottle or the like.

Still another object of the present invention is to provide such a combined bottle closure and mixing stick that is economical to manufacture and efficient in operation and which is rugged in structure and foolproof in use.

These and other objects of the invention will become apparent from a reading of the following specification and claims together with the accompanying drawings, wherein like parts are referred to and indicated by like reference characters and wherein:

FIGURE 1 is a fragmentary elevational view, with parts broken away and in section, and showing the upper or neck portion of a bottle, and showing the combined bottle closure and mixing stick thereon.

FIGURE 2 is an elevational view of the combination bottle closure and mixing stick of the present invention per se.

FIGURE 3 is a view generally similar to FIGURE 2, but illustrating a modification, with parts broken away and in section.

FIGURE 4 is a sectional view taken on the line 4—4 of FIGURE 3.

FIGURE 5 is a fragmentary sectional view of a further modification.

FIGURE 6 is a top plan view with the cap of FIGURE 5 removed.

FIGURE 7 is a sectional view showing or illustrating further details regarding the modifications of FIGURES 5 and 6.

FIGURE 8 is an elevational view of a bottle, with parts broken away and in section, and showing a further modification of a combination bottle closure and mixing stick connected to the bottle.

FIGURE 9 is an elevational view showing the combination bottle closure and mixing stick of FIGURE 8 per se.

FIGURE 10 and FIGURE 11 are views showing the parts of the mixing stick after their weakening section is ruptured or broken.

FIGURE 12 is a fragmentary sectional view of a further modification.

FIGURE 9ᵃ is a perspective view, with parts broken away and in section, of a further modification.

Referring in detail to the drawings, and more particularly to FIGURES 1 and 2 of the drawings, the numeral 20 indicates a portion of a container or bottle and includes a neck 21 of conventional construction, and the numeral 22 indicates a closure which is in the nature of a combination bottle closure and mixing stick, and the closure 22 embodies or includes a stopper 23 which is adapted to be made of a suitable yieldable material such as cork, and the stopper 23 is arranged snugly within the upper portions of the neck 21, FIGURE 1. The closure 22 further includes a body portion 24 which is suitably affixed to the upper section of the stopper 23, and the body portion 24 includes an externally roughened or knurled surface 25 for facilitating the manual gripping thereof. As shown in FIGURE 1 the body portion 24 includes a lower edge 26 which is adapted to abut the upper edge 27 of the neck 21 when the closure 22 is properly mounted on the bottle 20.

The combination bottle closure and mixing stick 22 further embodies a stick which is indicated generally by the numeral 28, and the stick 28 includes an elongated shank 29 which has a ball-shaped element or member 30 on the upper end thereof, and the ball-shaped element 30 is embedded in the stopper 23. A ball-shaped member 31 is arranged on the lower end of the shank 29, FIGURE 2.

In FIGURE 1 the numeral 32 indicates some of the liquid or fluid which may be aranged in a bottle such as the bottle 20.

Attention is now directed to FIGURES 3 and 4 of the drawings, wherein there is illustrated a modified combined bottle closure and mixing stick which is indicated generally by the numeral 22′, and the device 22′ has a function and construction which is generally similar to the previously described device of FIGURES 1 and 2. Thus the device 22′ includes the stopper 23, and the numeral 28′ indicates a stick which includes elongated shank 29′, and there is provided on the upper end of the shank 29′ a head 33 which includes a plurality of pointed barbs 34, and the head 33 has a shape generally resembling an arrow. The head 33 is embedded in the stopper 23, and the pointed barbs 34 help maintain the head 33 in place in the stopper 23.

Referring now to FIGURES 5, 6, and 7 of the drawings, there is illustrated a further modification, wherein the numeral 35 indicates a portion of a bottle or container which includes a neck 36 that has an annular bead 37 adjacent the upper outer surface thereof, and there is defined an annular groove 38 adjacent the upper portion of the bead 37.

The numeral 39 indicates a closure which includes a cap 40, and the cap 40 comprises a depending flange or skirt portion 41 which is provided with an inwardly projecting annular lip 42 for engaging the grooves 38, and the cap 40 further includes a top section 43.

The closure 39 of FIGURES 5, 6, and 7 further includes a holder 44 which includes or embodies an upper outer peripheral rim portion 45 which is interposed between the top section 43 and the upper edge of the neck 36, and the holder 44 further includes a depending generally rounded well section 46 that has a central aperture or opening 47 therein. The numeral 48 indicates a stick which includes an elongated shank 49 which projects through the aperture 47 in the well section 46, and there is provided on the upper end of the shank 49 an enlarged ball-shaped element 50, and there is provided on the lower end of the shank 49 an enlarged base piece or shoulder 51. The diameter of the ball-shaped element 50 is greater than the diameter of the opening 47, but the diameter of the base piece 51 is less than the diameter of the opening 47 so as to permit the stick 48 to be separated from the holder 44 as for example as shown in FIGURE 7 wherein the base piece 51 is small enough so that it can pass through the opening 47. However, the ball-shaped element 50 is large enough so that the ball-shaped element 50 cannot pass down through the opening 47.

In FIGURE 5 the numeral 52 indicates liquid or fluid in the bottle 35.

Referring now to FIGURES 8, 9, 10, and 11 of the drawings, the numeral 53 indicates a bottle or container which includes the main body portion 54 of increased size as well as a neck 55 of decreased size, and the neck 55 is provided adjacent the upper outer surface thereof with threads 56, and in FIGURE 8 the numeral 57 indicates liquid or fluid in the bottle 53.

In FIGURE 8 the numeral 58 indicates the combination bottle closure and mixing stick, which consists of a cap that is indicated generally by the numeral 59, and the cap 59 includes a top section 60 which has a flange or skirt portion 61 depending therefrom, and the flange 61 is provided with threads 62 for engagement with and coaction with the threads 56 on the neck 55. The numeral 63 indicates a circular disc which is interposed between the top section 60 and the upper edge of the neck 55, and the numeral 64 indicates a stick which depends from the disc 63 and which is operatively connected thereto. The stick 64 includes an elongated shank 68 which has an enlarged base piece 65 on the lower end thereof, and the shank 68 is provided with a weakened section 66 which is adapted to be broken or ruptured as for example after the closure 58 has been disconnected from the bottle 53, wherein as shown in FIGURE 10 after the main portion of the shank has been separated, a short or stub section 67 may remain attached to the disc 63. The main body portion of the shank 68 has the base piece 65 integral therewith, so that the unit shown in FIGURE 11 which is broken off or separated from the closure can be used as a convenient mixing stick for stirring or mixing drinks or the like.

Referring now to FIGURE 12 of the drawings, there is shown a portion of a bottle which is indicated generally by the numeral 69, and the bottle 69 includes a neck portion 70 which is provided with an annular bead 72 adjacent the upper outer surface thereof, and there is defined an annular groove 73 immediately above the beads 72. The numeral 72 indicates the combination bottle closure and mixing stick for the bottle 69, and the closure 71 includes cap 74 which comprises a top section 75 that has an annular flange 76 depending therefrom, and the flange 76 is provided with an inwardly directed lip of annular formation which is adapted to snugly engage the groove 73 in the neck 70.

There is further provided a holder which is indicated generally by the numeral 78, and the holder 78 includes an upper circumferential rim portion 79 which is interposed between the top section 75 and the upper edge of the neck 70, and the holder 78 further includes a depending well portion 80 which is provided with a central aperture or opening 81 therein for the projection therethrough of the mixing stick or shank 82. The numeral 83 indicates an enlargement or shoulder on the upper end of the stick 82, and there is provided a fanciful body piece, and the body piece 84 is adapted to be secured to or formed integral with the shoulder 83, and the fanciful body piece 84 may have any suitable configuration or design and this body piece 84 is adapted to be snugly received within the well portion 80, as shown in FIGURE 12.

Referring now to FIGURE 9a of the drawings, there is illustrated a device which is indicated generally by the numeral 85, and the device 85 includes a circular disc 86 of flat stock, and the numeral 87 indicates a stick which depends from the disc 86 and which is secured thereto or formed integral therewith, and the stick 87 may be provided with an upper portion 88 of reduced size.

From the foregoing, it is apparent that there has been provided a combination bottle closure and mixing stick, and in use with the parts arranged as shown in the drawings, it will be seen that for example when using the closure 22 of FIGURES 1 and 2, the closure can be arranged on a bottle such as the bottle 20 so that the stopper 23 is snugly received in the upper end of the neck 21, and in this position the stick 28 depends from the stopper 23 so that the stick 28 conveniently hangs or is suspended within the bottle 20. The enlargement or ball-shaped member 30 maintains the stick 28 connected to the stopper 23. By removing the closure 22 from the bottle 20, and then pouring or dispensing some of the liquid 32 from the bottle 20 into a glass or the like, the closure 22 can be held in the hand and then the stick 28 can be used for stirring or mixing the drink or the like as for example when such a drink is in a beverage glass or other container. The ball-shaped element 31 on the lower end of the stick 28 aids in the mixing or stirring of a drink.

Considering further the modification of FIGURES 3 and 4, the closure 22' is adapted to be used in a manner similar to the previously described closure 22. However, the closure 22' includes the stick 28' which is held in place in the stopper 23 by means of the arrow shaped head 33 which includes the pointed barbs 34 that effectively retain the stick 28' connected to the stopper 23. Otherwise the use and construction of the device 22' is the same as described in connection with the previously described closure 22.

In the modifications of FIGURES 5, 6, and 7, when the parts are in the position of FIGURE 5, the cap 40 has its lip 42 engaging the grooves 38 so as to maintain the parts in their assembled position on the bottle 35. However, when sufficient pressure is applied to the cap 40, the cap 40 can be disconnected from the neck of the bottle. With the parts in the position of FIGURE 5, it will be seen that the rim portion 45 of the holder 44 is retained between the top section 43 and the upper edge of the neck 36, and the stick 48 has its shank 49 extending through the opening 47 in the holder 44, and the ball-shaped member 50 prevents the stick 48 from moving down too far in the device. By removing the cap 40 from the bottle, the user can grip the member 50 and pull up on the stick 48 as for example as shown in FIGURE 7 so that the stick 48 can be pulled up through the opening 47, and the base piece 51 is small enough to pass through the opening 47 in the holder 44 whereby after the stick 48 has been removed it can be used for conveniently stirring a drink or the like.

In the arrangement shown in FIGURES 8, 9 10, and 11, the stick 64 may be made as an integral part of the disc 63, so that with the parts in the position of FIGURE 8, the disc 63 is held and interposed between the top section 60 in the upper edge of the neck 55 whereby the stick 64 will conveniently hang down into the bottle 53. However, by properly rotating the cap 69, the threaded section 62 of the flange 61 will move out of threaded engagement with the threaded portion 56 of the neck 55 so that the unit shown in FIGURE 9 can be manually removed from the bottle whereby the shank portion 68 can be broken off at the weakened section 66 in order to provide the unit shown in FIGURE 11 which is adapted to function as a convenient mixing or stirring stick or element or instrument. The weakened section 66 may consist of an area of reduced cross section or size so as to facilitate the breaking or rupturing of the shank at this point.

With reference to the modification of FIGURE 12, the cap 74 may be held in place on the neck of the bottle by a friction fit due to the provision of the inwardly projecting lip 77 which engages the groove 73 in the neck of the bottle 59. The holder 78 has its rim 79 held in place below the top section 75 of the cap 74, and the stick 82 extends down through the opening 81 in the lower portion of the holder 78, and there is provided the enlargement or shoulder 83 for preventing the stick 82 from moving down too far through the opening 81. The fanciful article or element 84 is adapted to be suitably affixed to the shoulder 83, and this article 84 may be of a size so that it is conveniently received in well section 80. As shown in FIGURE 12 the element 84 may be shaped to resemble Seven Crown, but it is to be understood that the present invention is not restricted to any particular fanciful shape or configuration for the element 84, and the element 84 can serve as a convenient or decorative item for the article of the present invention.

The article 85 shown in FIGURE 9a can be used in conjunction with a bottle such as bottle of ketchup, and wherein the disc 86 may be retained in place adjacent the neck of the bottle by means of the usual cap for the ketchup bottle or the like, and the stick 87 can be used as a means for facilitating scraping of ketchup or the like from the bottle or other container. That is the disc 86 can be gripped manually and the stick 87 can be used for helping to remove the contents of a jar, bottle or the like onto a plate or other member.

The parts can be made of any suitable material and in different shapes or sizes.

The present invention does not require a special retainer for holding the device in place and the present invention is adapted to make use of the sealer which is a necessary part of all screw threaded caps or the like that are used to close liquor botles so that the present invention will have a minimum cost, and will be easy to produce. The present invention is especially suitable for use on a bottle of liquor and the parts can be made of a material which are not affected by the contents of the bottle which comes in contact with it. In FIGURE 8 an important feature is the point of weakness as indicated by the numeral 66 which constitutes a break joint. The stirrer integrated with the disc should be used without using the bottle cap to hold it and without any adjuncts or supports simply by placing the disc over the mouth of the bottle and letting the shaft or shank depend into the bottle. The screw threaded cap may be screwed into place over the disc which would also act as a sealer. This uncomplicates the problem completely for this type of cap and makes the stirrer assembly independent. Due to the provision of the point of weakness 66, the unit shown in FIGURE 11 can be broken off and separated, and that is the stirrer can be separated from the disc 63.

As a further modification, the disc may be depressed in the middle inside the neck of the bottle leaving a rim to engage the mouth of the bottle whereby this shape will fit the mouth or opening of the bottle and cause the unit automatically to fall into place. The space or chamber thus created under the bottle cap provides an enlargement at the upper end of the stirrer which permits the stirrer to depend freely from the holder through an opening, or the opening may be sealed around the stirrer very thinly to permit its being easily pushed or pulled out and separated from the holder. This form also permits the use of a glass stirrer, which could not be used if it had to be separated from the supporting or retaining medium by breaking because of chipping. A further modification may be the attachment of the stirrer to the screw threaded cap by means of a suction cup.

Primarily the present invention is the concept of a mixing stick combined with a screw on type of bottle cap or closure, and the present invention embodies a novel and efficient construction as well as the use or application thereof. With reference to FIGURE 9a, the article 85 is adapted to be used in conjunction with the ketchup bottles or the like to start the flow of ketchup which is sometimes a problem. The rod or working end 87 may be shaped like a paddle, spoon or dipper, as desired or required.

In the present invention a cork bottle stopper is utilized in combination with a drink stirrer, or else there is utilized the combination of a screw type bottle cap with a stirrer or mixer. The device may be made and sold as a novelty item. With reference to FIGURE 5, the concave portion of the holder 44 is arranged inside the neck of the bottle, and the rim 45 of the holder rests on the mouth of the bottle, and the stirrer has the enlargement 50 and the stirrer can be separated from the holder and used independently thereof. This form of the device as shown in FIGURE 5 permits the unit to easily fall into place and seat itself. By making the recess deeper as for example as shown in FIGURE 12, a design of a manufacturer's trademark or the like as indicated by the numeral 84 for an emblem or other fanciful article can be mounted on the upper end of the stirrer for advertising purposes. Or, an effective advertizing result can be achieved by depending the stirrer from the bottom side of the disc and using a point of weakness to separate it from the disc.

The present invention is therefore a combination bottle closure and mixing stick, and the present invention is adapted to include or embody a cork stopper and a screw type bottle cap and drink mixing stick and wherein the closure is combined with the mixing stick in a single unit to serve in a double capacity of a closure and mixing device. With the present invention a drink mixing instrument is immediately and readily available when needed, so that at the time the bottle is opened and the drinks are poured, the instrument is available, and the instrument or device is simple in construction, easy to use, and is readily available and at hand when needed in such places as hotel rooms, motels, camps, boats, and other places where the proper instruments are usually not available. Also, the present invention provides a convenient advertizing medium for the manufacturer of whiskey or liquor, the bottler or the seller, and also the advertizements can be placed on the mixing stick and as soon as the mixing stick is detachable it provides a permanent advertizing medium. Also, the bottler or seller can utilize the present invention as a sales promotion medium by offering to the prospective buyer of a bottle of whiskey and the like a useful, practical, convenient and valuable and desirable article as an integral part of the package.

The mixing stick 28 of FIGURES 1 and 2 may have a generally conventional construction except that it has the enlarged head or element 30 which retains the stick connected to the stopper 23. In FIGURE 8 the break off section 66 permits the stick 64 to be broken off and separated from the stopper or disc so that it can be used independently and retained as a separate instrument. In FIGURES 3 and 4, the arrow-shaped head 33 provides a convenient means for attaching the stick 28' to the stopper 23, and by pulling on the stick 28' with sufficient force, the head 33 can be separated from the stopper 23. A break joint may also be used in conjunction with the device shown in FIGURES 3 and 4 if desired or required. The disc such as the disc 63 may be made of a suitable material such as heavy paper type material which is liquid proof. In the present invention two separate and distinct devices are combined to form a single unit.

Minor changes in shape, size and rearrangement of details coming within the field of invention claimed may be resorted to in actual practice, if desired.

What is claimed is:

1. For use with a bottle having a neck, a combined, but readily separable closure member and stirrer stick comprising a holder; said holder having a flanged rim portion of smaller diameter than the outside diameter of, and adapted to rest upon said neck; said holder having a well portion adapted to rest within said neck and depending centrally from said rim and provided with a central aperture of lesser diameter than said well at its center; a readily removable stirrer stick having an elongated shank of smaller diameter than said aperture and adapted to be disposed upright within said neck and loosely and removably through said aperture in said well portion; an enlarged body provided on the upper end of said shank and adapted to be disposed with said enlarged body loosely and removably positioned within said well portion, and said enlarged body being of a size greater than said aperture to removably support said stirrer stick therewithin.

2. A combined but readily separable closure and stirrer stick as defined in claim 1, wherein said depending well portion is generally of a hemispherical configuration and open at the upper side; and with the enlarged body on the upper end of said stirrer stick being of generally spherical configuration to complementally and freely seat within said well portion.

3. A combined but readily separable closure and stirrer stick as defined in claim 1, wherein the shank of the stirrer stick is provided with a second enlarged body at the opposite and lowermost end, said second enlarged body being of a size slightly greater than the thickness of said shank but smaller than the size of the aperture in said well, to permit its selective removal from said holder and closure in an upward direction away from the top of the holder.

References Cited in the file of this patent

UNITED STATES PATENTS

| | | |
|---|---|---|
| 1,174,828 | Copeland | Mar. 7, 1916 |
| 1,312,569 | Paige | Aug. 12, 1919 |
| 1,615,603 | Vickery | Jan. 25, 1927 |
| 1,811,612 | Carpenter | June 23, 1931 |
| 1,949,902 | Desser | Mar. 6, 1934 |
| 1,950,293 | Carvalho | Mar. 6, 1934 |
| 2,096,975 | Revson | Oct. 26, 1937 |
| 2,123,118 | Osborn et al. | July 5, 1938 |
| 2,164,244 | Jung | June 27, 1939 |
| 2,344,471 | Moreland | Mar. 14, 1944 |

FOREIGN PATENTS

| | | |
|---|---|---|
| 79,792 | Switzerland | May 16, 1919 |
| 122,093 | Great Britain | Jan. 16, 1919 |